United States Patent
Chen et al.

(10) Patent No.: US 6,289,129 B1
(45) Date of Patent: Sep. 11, 2001

(54) VIDEO RATE BUFFER FOR USE WITH PUSH DATAFLOW

(75) Inventors: Xuemin Chen; Robert O. Eifrig, both of San Diego, CA (US)

(73) Assignees: Motorola, Inc., Schaumburg, IL (US); General Instrument Corporation, Horsham, PA (US)

( * ) Notice: Subject to any disclaimer, the term of this patent is extended or adjusted under 35 U.S.C. 154(b) by 0 days.

(21) Appl. No.: 09/219,913

(22) Filed: Dec. 23, 1998

Related U.S. Application Data

(60) Provisional application No. 60/090,023, filed on Jun. 19, 1998.

(51) Int. Cl.⁷ .................................................. G06K 9/36
(52) U.S. Cl. .................................................. 382/232
(58) Field of Search .................................. 382/232, 236, 382/238, 240, 242, 248, 250; 348/384, 385, 387, 388, 390, 394, 395, 400, 401, 402, 403, 404, 407, 408, 409, 410, 411, 412, 413, 414, 415, 416, 419, 420, 421, 423, 425, 426, 431, 699; 386/52

(56) References Cited

U.S. PATENT DOCUMENTS

| | | | |
|---|---|---|---|
| 5,122,875 | * | 6/1992 | Raychaudhuri et al. ............ 348/390 |
| 5,144,425 | * | 9/1992 | Joseph ................................. 348/419 |
| 5,231,384 | * | 7/1993 | Kuriacose ............................ 348/426 |
| 5,500,673 | * | 3/1996 | Zhou .................................... 348/156 |
| 5,543,853 | * | 8/1996 | Haskell et al. ...................... 348/419 |
| 5,565,924 | * | 10/1996 | Haskell et al. ...................... 348/423 |
| 5,623,311 | * | 4/1997 | Phillips et al. ...................... 348/396 |
| 5,668,599 | * | 9/1997 | Cheney et al. ...................... 348/402 |
| 5,805,762 | * | 9/1998 | Boyce et al. ........................ 348/384 |
| 5,862,140 | * | 1/1999 | Shen et al. .......................... 348/387 |
| 5,956,088 | * | 9/1999 | Shen et al. .......................... 348/385 |
| 6,018,611 | * | 1/2000 | Nogami et al. ....................... 386/52 |

FOREIGN PATENT DOCUMENTS

| | | |
|---|---|---|
| 96 17492 | 6/1996 | (WO) . |
| 98 15915 | 4/1998 | (WO) . |

OTHER PUBLICATIONS

Mitchell, J. et al., "MPEG Video Compression Standard," Chapmann & Hall, 1996, XP002115299, p. 340, paragraph 2—p. 356.

* cited by examiner

Primary Examiner—Jose L. Couso
(74) Attorney, Agent, or Firm—Barry R. Lipsitz

(57) ABSTRACT

A technique is provided for enabling data, such as video, to be broadcast using a push dataflow scenario without causing a data rate buffer for the pushed data at a decoder to overflow or underflow. At an encoder, data are encoded for communication to the decoder to provide an output bitstream. The data rate buffer of the decoder is simulated at the encoder. The simulation is used to control the output bitstream to preclude overflow or underflow of the decoder buffer. For example, a complementary encoder buffer, which operates in a manner opposite to the decoder buffer, can be monitored and inverted to provide the simulation. Various different techniques are disclosed for controlling the amount of data produced at the encoder to maintain the data within the confines of the decoder buffer.

81 Claims, 2 Drawing Sheets

VIDEO RATE BUFFER FOR USE WITH PUSH DATAFLOW

This application claims the benefit of U.S. Provisional Application No. 60/090,023, filed Jun. 19, 1998.

BACKGROUND OF THE INVENTION

The present invention relates to the buffering of video data, and more particularly to the buffering of video data provided to a viewer using a push dataflow scenario. Push dataflow is a technique wherein data, such as video, text and/or graphic information, is broadcast to a viewer without interaction (except for, possibly, the advance establishment of an information profile by the recipient).

In a push dataflow communication scheme, a video rate buffer model is required in order to bound the memory requirements needed by the video decoder. With a rate buffer model, the video encoder can be constrained to make bitstreams which are decodable with a predetermined buffer memory size at the decoder.

The MPEG-4 Visual Final Committee Draft (FCD) No. N2202 published by the Moving Picture Experts Group (MPEG) and incorporated herein by reference, does not currently specify a video rate buffer model relating the access unit size (e.g., coded "video object plane" (VOP) size), decoding time, and bit rate of a video data stream to a buffer size for buffering the corresponding data. Annex D of the FCD on the video buffering verifier (VBV) discusses an empty placeholder for this information. The MPEG-4 Systems FCD (N2201), also incorporated by reference, defines a buffer model. However no normative definition of the relevant fields is provided in a manner consistent with video.

It would be advantageous to provide a buffer model compatible with the aforementioned Annex D that explicitly states the relationship between the syntax in the visual FCD and the systems FCD. Such a buffer model should be able to be easily and straightforwardly implemented using appropriate rate buffer management techniques in order to bound the memory requirements needed by a video decoder, thereby enabling the successful provision of push dataflow. The present invention provides a video rate buffer model and management techniques having the aforementioned and other advantages.

SUMMARY OF THE INVENTION

In accordance with the invention, a method and apparatus are provided for enabling data, such as video, to be broadcast using a push dataflow scenario without causing a data rate buffer for the pushed data at a decoder to overflow or underflow. At an encoder, data are encoded for communication to the decoder to provide an output bitstream. The data rate buffer of the decoder is simulated at the encoder. The simulation is used to control the output bitstream to preclude overflow or underflow of the decoder buffer. For example, a complementary encoder buffer, which operates in a manner opposite to the decoder buffer, can be monitored and inverted to provide the simulation. Various different techniques are disclosed for controlling the amount of data produced at the encoder to maintain-the data within the confines of the decoder buffer. These include reducing the quantization level to generate large VOPs or outputting stuffing bits at the end of the VOP when the simulation at the encoder indicates that the decoder buffer has or will become too full. When the simulation indicates that the decoder buffer has or will become too empty, the encoder can increase quantization levels to generate fewer bits, or delay the generation of the next VOP, or zero the high frequency coefficients to reduce the number of bits generated per VOP.

DETAILED DESCRIPTION OF THE INVENTION

The MPEG-4 video buffering verifier (VBV) is an algorithm for checking a bitstream plus delivery rate function, R(t), to verify that the amount of rate buffer memory required in a push dataflow scenario is less than the stated buffer size. If a visual bitstream is composed of multiple Video Objects (VOs), each with one or more VOLs (Video Object Layers), the rate buffer model is applied independently to each VOL (using buffer size and rate functions particular to that VOL).

The present invention applies a buffer verification technique to natural video coded as a combination of I, P and B-VOPs, and can be extended to cover the full visual syntax, as well as sprites and synthetic video objects. In accordance with the invention, the video encoder controls its output bitstream to comply with the requirements of a video buffering verifier (VBV). The VBV is defined as follows:

1. The VBV size is specified in units of 16384 bits by vbv__buffer__size field provided in the VOL header. A vbv__buffer__size of 0 is forbidden. "B" is defined as 16384×vbv__buffer__size and is the buffer size in bits. Note that in the example embodiment disclosed herein, the maximum size of the VBV buffer is four Gbits. The value of vbv__buffer__size can only be changed after a visual__object__sequence__end__code.

2. The instantaneous video object layer channel bit rate seen by the encoder is denoted by $R_{vol}(t)$ in bits per second. If the bit__rate field in the VOL header is present, it defines a peak rate (in units of 400 bits per second; a value of 0 is forbidden) such that $R_{vol}(t)$= 400×bit__rate Note that $R_{vol}(t)$ counts only visual syntax for the current VOL (refer to the definition of $d_i$ below). If the channel is a serial time multiplex containing other VOLs or as defined by ISO/IEC 14496-1 with a total instantaneous channel rate seen by the encoder of R(t), then $$R_{vol}(t) = \begin{cases} R(t) & \text{if } t \in \{\text{channel bit duration of a bit from VOL } vol\} \\ 0 & \text{otherwise} \end{cases}$$

3. The VBV buffer is initially empty. After finding the first VOL header, the vbv__occupancy field is examined to determine the initial occupancy of the VBV buffer in 64-bit units before decoding the initial VOP immediately after the VOL header. The first bit in the VBV buffer is the first bit of the VOP (defined in paragraph 4 below) which includes the VOL header containing the vbv__occupancy field. The difference between later vbv__occupancy fields in subsequent VOL headers and the running cumulative buffer occupancy ($b_i+d_i$ as defined below) just before removal of the VOP containing the VOL header shall be less than 64 bits.

Figure 1:
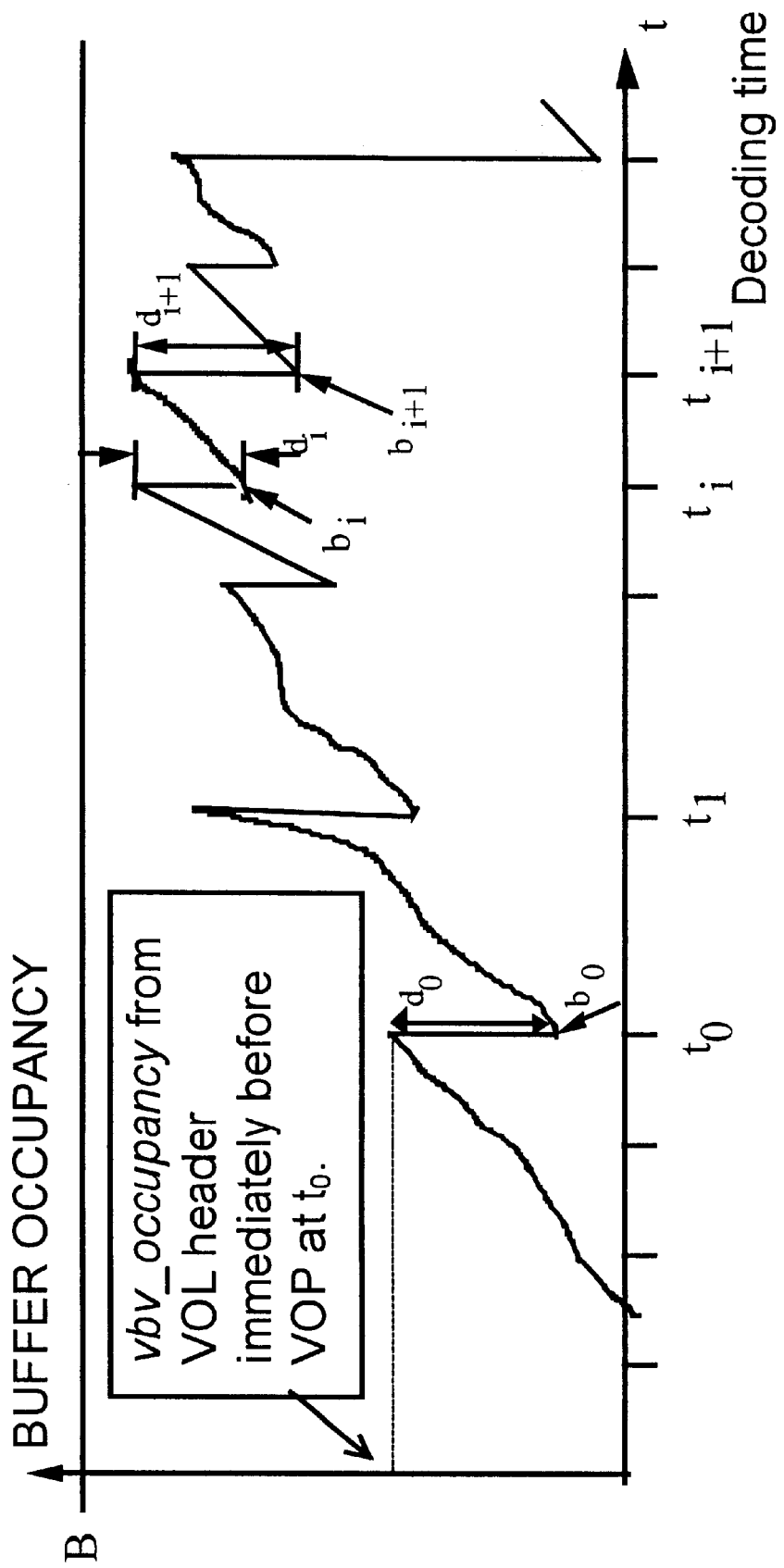
FIG. 1 is a graph that plots buffer occupancy (b(t)<B) with respect to decoding time (t)

4. Define $d_i$ to be the size in bits of the i-th VOP where i is the VOP index which increments by 1 in decoding order. The parameter $d_i$ is illustrated in FIG. 1, which plots buffer occupancy (b(t)<B) with respect to decoding time (t). More precisely, $d_i$ is the number of visual syntax bits either:

(1) from the last bit of the previous video object, still texture object, mesh object or face object exclusive (and excluding any stuffing codewords immediately following this bit); or (2) from the first bit of the visual_object_sequence_start_code inclusive (in the case of the first VOP of a visual bitstream) to the last bit of the current VOP inclusive (including any stuffing codewords at the end of the VOP), including video object headers, video object layer headers, and group of VOP headers which precede the VOP itself. Note that the size of a coded VOP ($d_i$) is always a multiple of 8 bits due to start code alignment.

5. Let $t_i$ (FIG. 1) be the decoding time associated with VOP i in decoding order. All bits ($d_i$) of VOP i are removed from the rate buffer instantaneously at $t_i$. This instantaneous removal property distinguishes the VBV buffer model from a real rate buffer.

6. $\tau_i$ is the composition time (or presentation time in a no-compositor decoder) of VOP i. For a video object plane, $\tau_i$ is defined by vop_time_increment (in units of 1/vop_time_increment resolution-ths of a second) plus the cumulative number of whole seconds specified by module_time_base. In the case of interlaced video, a VOP consists of lines from two fields and $\tau_i$ is the composition time of the first field. The relationship between the composition time and the decoding time for a VOP is given by $$t_i = \tau_i - (((vop\_coding\_type=B\|OP)\|low\_delay)?0:m_i)$$

where low_delay is true (1) if the VOL contains no B-VOPs. If B-VOPs are present, then the composition of an anchor VOP is delayed until all immediately subsequent B-VOPs have been composed. This delay period is $m_i = \tau - \tau_f$, where f is the index of the nearest-future anchor VOP of VOP i while p is the index of the current (or the nearest-past) anchor vop of vop i.

The following example demonstrates how $m_i$ is determined for a sequence with variable numbers of consecutive B-VOPs:

Decoding order: $I_0 P_1 P_2 P_3 B_4 P_5 B_6 P_7 B_8 B_9 P_{10} B_{11} B_{12}$

Presentation order: $I_0 P_1 P_2 B_4 P_3 B_6 P_5 B_8 B_9 P_7 B_{11} B_{12} P_{13}$ Assume that vop_time_increment=1 and modulo_time_base=0 in this example. The sub-index i is in decoding order.

| i | $\tau_i$ | $t_i$ | $m_i$ |
|---|---|---|---|
| 0 | 0 | 0 − 1 = −1 | 1 |
| 1 | 1 | 1 − 1 = 0 | 1 |
| 2 | 2 | 2 − 1 = 1 | 1 |
| 3 | 4 | 4 − 2 = 2 | 2 |
| 4 | 3 | 3 | 2 |
| 5 | 6 | 6 − 2 = 4 | 2 |
| 6 | 5 | 5 | 2 |
| 7 | 9 | 9 − 3 = 6 | 3 |
| 8 | 7 | 7 | 3 |
| 9 | 8 | 8 | 3 |
| 10 | 12 | 12 − 3 = 9 | 3 |
| 11 | 10 | 10 | 3 |
| 12 | 11 | 11 | 3 |

7. Define $b_i$ as the buffer occupancy in bits immediately following the removal of VOP i from the rate buffer. The parameter $b_i$ is illustrated in FIG. 1. Using the above definitions, $b_i$ can be iteratively defined:

$$b_0 = 64 \times vbv\_occupancy - d_0$$

$$b_{i+1} = b_i + \int_{t_i}^{t_{i+1}} R_{vol}(t) dt - d_{i+1} \text{ for } i \geq 0$$

8. The rate buffer model requires that the VBV buffer never overflow or underflow, that is:

$$0 < b_i \text{ and } b_i + d_i \leq B \text{ for all } i$$

Real-valued arithmetic is used to compute $b_i$ so that errors are not accumulated.

A coded VOP size must always be less than the VBV buffer size, i.e., $d_i < B$ for all i.

It is a requirement on the encoder to produce a bitstream which does not overflow or underflow the decoder's VBV buffer. This means the encoder must know $R_{vol,decoder}(t)$, the instantaneous channel bitrate seen by the decoder. A channel has constant delay if the encoder bitrate at time t when a particular bit enters the channel, $R_{vol,encoder}(t)$ is equal to $R_{vol,decoder}(t+L)$, where the bit is received at (t+L) and L is constant. In the case of constant delay channels, the encoder can use its locally estimated $R_{vol,encoder}(t)$ to simulate the VBV occupancy and control the number of bits per VOP, $d_i$, in order to prevent overflows or underflows.

The VBV model assumes a constant delay channel. This allows the encoder to produce a VOL bitstream which does not overflow or underflow the buffer using $R_{vol,encoder}(t)$—note that $R_{vol}(t)$ is defined as $R_{vol,encoder}(t)$ in paragraph 2 above.

Figure 2:
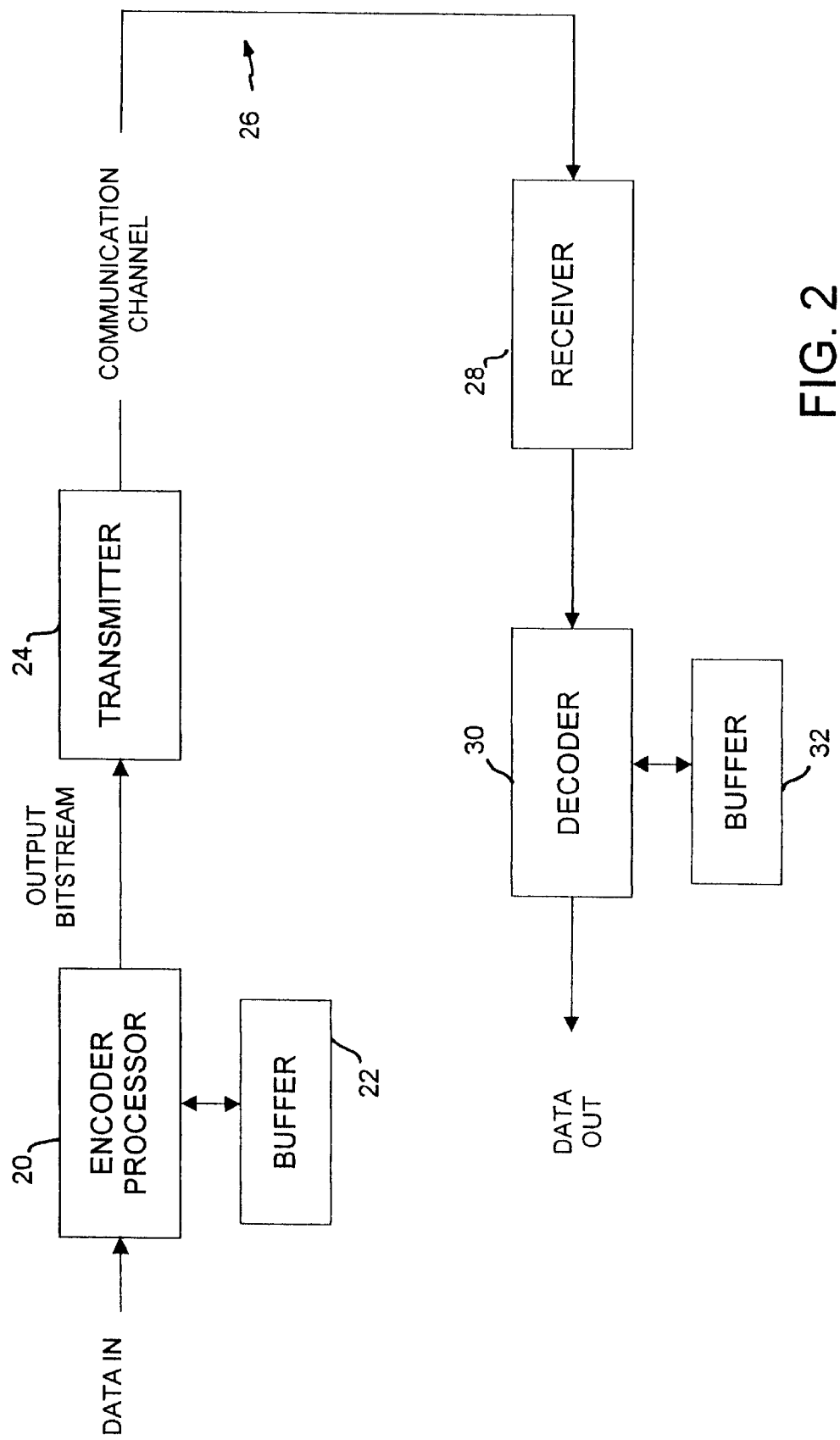
FIG. 2 is a block diagram illustrating encoder and decoder apparatus in accordance with the invention.

FIG. 2 illustrates the encoder and decoder in simplified block diagram form. Data to be encoded are input to the encoder processor 20, which is coupled to an encoder data rate buffer 22. Buffer 22 operates in a complementary manner to a data rate buffer 32 of the decoder 30. By monitoring the data rate buffer 22, the encoder processor 20 is able to simulate the data rate buffer 32 of the decoder.

The encoder processor provides an output bitstream to a transmitter 24, which transmits the bitstream over a communication channel 26 to a receiver 28. The receiver provides the received bitstream to the decoder 30 in a conventional manner. Decoder 30 decodes the bitstream to provide the desired output data.

A description of how to handle real time video in a non-constant delay network environment follows. This procedure is a hypothetical model only; it is not a requirement or recommendation on how to interface MPEG-4 bitstreams to non-constant delay channels. If the channel does not have a constant delay, such that:

1. unknown, variable, packet-by-packet queuing delays in network interfaces and intermediate nodes (e.g., switches or routers as used by ATM or IP networks) are present, and
2. the information is delivered in time stamped packets, and
3. there is a bound on the difference between the minimum and maximum channel latency of a packet (as determined, for example, by a quality of service negotiation), then a constant delay channel can be approximated using a de-jittering buffer before the decoder. The de-jittering buffer holds each variable latency packet until the maximum channel latency has elapsed (the holding duration is based on the packet time stamp) before the packet is released to the decoder. The resulting channel now has a constant delay equal to the maximum channel latency.

Syntax Modifications:

The present invention modifies the syntax of the MPEG-4 standard by adding a vbv_occupancy field (26 bits) to the VOL header. The value of this integer is the VBV occupancy in 64-bit units just before the removal of the first VOP following the VOL header. The purpose for the quantity is to provide the initial condition for VBV buffer fullness.

To prevent duplication of information between MPEG-4 System (ISO/IEC 14496-1) and MPEG-4 Visual (ISO/IEC 14496-2), and to allow a visual elementary stream as a stand-alone entity to specify a buffer model, a vbv_parameters flag is added to control the inclusion to VOP_rate_code, bit_rate, low_delay vbv_size, and vbv_occupancy in the VOL header. The value of vbv_parameters shall be "1" for a push dataflow visual bitstream when the equivalent information is not present in an encapsulating systems multiplex. The vol_control_parameters bit remains in the syntax to control the inclusion of the chroma_format and aspect_ratio_information fields in the VOL header.

The FCD VOL syntax contains potential start code emulation problems when bit_rate and vbv_size are present (since runs of 23 or more consecutive 0 bits can occur). Marker bits (which always have the value "1") have been added to avoid this problem. The fields split by marker bits are defined:

bit_rate=(bit_rate_msbsyyy<<12)|bit_rate_lsbs;

vbv_size=(vbv_size_msbs<<10)|vbv_size_lsbs;

vbv_occupancy=(vbv_occupancy_msbs<<15)|vbv_occupancy_lsbs;

The resultant syntax is shown in Table 1:

TABLE 1

| | No. of bits | Mnemonic |
|---|---|---|
| vol_control_parameters | 1 | blsbf |
| if (vol_control_parameters) { | | |
| aspect_ratio_information | 4 | uimsbf |
| chroma_format | 2 | uimsbf |
| } | | |
| vbv_parameters | 1 | blsbf |
| if (vbv_parameters) { | | |
| VOP_rat_code | 4 | uimsbf |
| bit_rate_msbs | 18 | uimsbf |
| marker_nit | 1 | blsbf |
| bit_rate_lsbs | 12 | uimsbf |
| low_delay | 1 | blsbf |
| vbv_size_msbs | 8 | uimsbf |
| marker_bit | 1 | blsfb |
| vbv_size_lsbs | 10 | uimsbf |
| vbv_occupancy_msbs | 11 | uimsbf |
| marker_bit | 1 | blsbf |

TABLE 1-continued

| | No. of bits | Mnemonic |
|---|---|---|
| vbv_occupancy_lsbs | 15 | uimsbf |
| } | | |

Notes to Table 1:
1. The encoding of aspec_ratio_information and VOP_rate_code are undefined in the MPEG-4 Visual FCD.
2. In order to use the encoded bitstream with a push dataflow model, it is a normative requirement that vbv_parameters must be set to "1" or the equivalent information, as defined in item 4 below, must be included in the systems layer.
3. If VOP_rate_code is provided, then the difference between composition times specified by VOP_time_increment and the cumulative modulo_time_base must be an exact integer multiple of the frame period associated with VOP_rate_code. In this case, the width of VOP_time_increment_resolution must be increased by one bit to exactly represent 59.94 Hz (i.e., 60000/1001 Hz).

Relationship to MPEG-4 Systems:

The following disclosure defines the relationship between the terminology, semantics and syntax of MPEG-4 Systems (ISO/IEC 14496-1) elementary stream interface and the visual decoder (or encoder) such that the System Decoder Model (SDM) is consistent with the Video Buffer Verifier. In this case, the visual VBV buffer and SDM decoding buffer ($DB_r$) have identical semantics. These buffers are one and the same in an integrated visual/systems decoder model.

1. A natural video access unit is a coded VOP. The size ($d_i$) and the precise composition of a coded VOP is defined above with reference to FIG. 1.

2. The object time base (OTB) used to determine the object clock reference (OCR), decoding time stamp (DTS), and composition time stamp (CTS) is the same time base used to determine the VOP_time_increment and modulo_time_base. The Sync Layer timeStampResolution and OCRResolution must be integer multiples of VOP_time_increment_resolution so than no temporal precision is lost and all temporal calculations are exact in integer arithmetic.

3. The composition time stamp is equal to $\tau_i$ plus a constant (K). That is:

$$CTS_i = n_i \times timeStampResolution + \frac{timeStampResolution \times VOP\_time\_increment_i}{VOP\_time\_increment\_resolution} + K$$

where $n_i$ is an accumulation of the modulo_time_base values since the initial VOL header, 4. The decoding time stamp from CTS is determined in a manner similar to the way $t_i$ is calculated from $\tau_i$, that is:

$$DTS_i=CTS_i-(((vop\_coding\_type==BVOP)||low\_delay)?0: m_i)$$

This equation specifies that decoding is instantaneous and the only difference between DTS and CTS reflects the reordering of anchor VOPs. Note that DTS is only present on anchor VOPs when low_delay is 0 (when the conditional expression above is true).

5. The relationship between the value of the encoder's local object time base value at the time and $DTS_i$ is defined here. Let the first bit of the access unit containing a VOL header be stored in the VBV (or SDM DB) buffer at time $OCR_i$ and vbv_occupancy specified in the same VOL header, then $$vbv\_occupancy = \frac{1}{64}\int_{OCR_i}^{DTS_i} R_{vol}(t)\,dt$$

It is an implicit requirement on OCRResolution and timeStampResolution that the calculation of vbv_occupancy be accurate to the nearest integer.

6. The System Layer (SL) RandomAccessPointFlag, if set to "1", denotes the presence of a VOL header in the access unit starting in this SL packet.

7. The DecoderConfigDescriptor value for bufferSizeDB is equal to 2048×vbv_buffer_size. The maxBitrate field must be 400×bit_rate.

The correspondence between the VOL header information controlled by the vbv_information bit and various syntax entities specified in MPEG-4 Systems layer is given below. In the event that information is duplicated by the two parts of the MPEG-4 standard, no disagreement is allowed.

1. VOP_rate_code is represented by the Sync Layer compositionUnitDuration and timeScale. In this case timeScale must be an integer multiple of VOP_time_increment resolution.
2. bit_rate and vbv_size are indicated by maxBitrate and bufferSizeDB in the DecoderConfigDescriptor.
3. vbv_occupancy is indirectly indicated by the difference between OCR and DTS as defined above.
4. low_delay is specified implicitly by DTS of the first I-VOP. If DTS is present (and unequal to PTS), then low_delay=0, else low_delay=1.

Comparison between the MPEG-4 VBV and the MPEG-2 VBV:

The MPEG-2 and MPEG-4 VBV models both specify that the rate buffer may not overflow or underflow and that coded pictures (VOPs) are removed from the buffer instantaneously. In both models a coded picture/VOP is defined to include all higher-level syntax immediately preceding the picture/VOP.

MPEG-2 video has a constant frame period (although the bitstream can contain both frame and field pictures and frame pictures can use explicit 2:3 pulldown via the repeat_first_field flag). In MPEG-4 terms, this frame rate would be the output of the compositor (the MPEG-2 terminology is the output of the display process that is not defined normatively by MPEG-2). This output frame rate together with the MPEG-2 picture_structure and repeat_first_field flag precisely defines the time intervals between consecutive decoded picture (either frames or fields) passed between the decoding process and the display process.

In general, the MPEG-2 bitstream contains B pictures (we assume MPEG-2 low_delay=0, refer to the next section for the case were low_delay=1). This means the coding order and display order of pictures is different (since both reference pictures used by a B picture must precede the B picture in coding order). The MPEG-2 VBV (and MPEG-2 systems T-STD) specifies that a B picture is decoded and presented (instantaneously) at the same time and the anchor pictures are re-ordered to make this possible. This is the same reordering model specified above in the definition of the composition time $t_1$. A hypothetical MPEG-4 decoder using the proposed MPEG-4 VBV buffer model exactly emulates a hypothetical MPEG-2 decoder using the MPEG-2 VBV buffer model if the MPEG-4 VOP time stamps given by vop_time_increment and the cumulative modulo_time_increment agree with the sequence MPEG-2 picture presentation times. We assume here that both coded picture/VOPs use the common subset of both standards (frame structured pictures and no 3:2 pulldown on the decoder, i.e., repeat_first_field=0). For example, if the MPEG-2 sequence is coded at 29.97 Hz (the NTSC picture rate), vop_time_increment_resolution must be 30000 and the change in vop_time_increment between consecutive VOPs in presentation order must be 1001 because picture skipping is not permitted in MPEG-2 (when low_delay=0).

H.263-like Buffer Model:

In H.263, there are no B-VOPs and no reordering of composition units between decoding and presentation.

The H.263 Hypothetical Reference Decoder (HRD) can be equivalent to the MPEG-4 VBV. In the H.263-like buffer model, the VBV buffer size vbv_buffer_size is computed by vbv_buffer_size=A+BPPmaxKb×1024 bits, where (BPPmaxKb×1024) is the maximum number of bits per picture that has been negotiated for use in the bitstream and $$A = 4 \times R_{max}/P,$$

where $R_{max}$ is the maximum video bit rate during the connection in bits per second and the picture frequency, P, is 29.97 Hz as specified for Common Intermediate Format (CIF), which corresponds to a vop_time_increment_resolution=30,000 and Δvop_time_increment=1001.

The VBV is initially empty. The VBV is examined at CIF intervals. If at least one complete coded VOP is in the buffer then all the data for the earliest VOP in bitstream (or decoding) order is instantaneously removed. Immediately after removing the above data the buffer occupancy must be less than A. In this case, the number of bits for the (i+1)-th coded picture $d_{i+1}$ must satisfy:

$$d_{i+1} \geq b_i + \int_{t_i}^{t_{i+1}} R(t)\,dt - A$$

Real-valued arithmetic is used in this inequality.
where
 $b_i$ is the buffer occupancy just after the i'th coded picture has been removed from the buffer;
 $t_i$ is the time the nth coded picture is removed from the VBV buffer; and
 R(t) is the video bitrate at time t.

The important distinction between the MPEG-4 VBV model and the H.263 model is that the encoder is specifying the composition time $t_i$ for each VOP in the bitstream, which again means that the encoder must know R(t) and A, the instantaneous bitrate as seen by the decoder. Again, this assumption is valid if a constant delay channel is assumed.

The MPEG-2 VBV model when low_delay=1 has several similarities to the HRD. First, no B-pictures are used so decoding and presentation order are the same. Second, there is a specified picture period (but not necessarily 29.97 Hz) used to examine the buffer. If the next picture to be decoded has not been totally received at the next picture period (such a picture is called a "big picture"), the buffer is re-examined at multiples of the picture period until the coded picture is fully resident in the buffer. The big picture will then be instantaneously decoded and displayed. The previous image remains in the decoder output during the picture periods while the big picture is not completely received. The encoder is still responsible for prevention of overflow and underflow and the difference between the MPEG-2 temporal_reference fields of the big picture and its predecessor is the duration of display of the picture before the big picture (in frame periods).

Extensions to the Complete Visual Syntax:

Covering the complete visual syntax requires extension for sprites, still texture objects, mesh objects and face objects. In this case VBV stands for visual buffer verifier.

Sprites:

Basic sprite, low latency sprite, and scalable sprite are specified in MPEG-4. There is no conceptual problem with the bitstream generation of sprites. However, a large vbv_size might be applied to take the advantage of larger sprite memory in the decoder.

Still Texture Objects:

A still texture object is a single access unit, however it cannot be composed directly. Still texture objects are used as input to a later decoder (e.g., the mesh decoder). The still texture objects have no buffer parameters or timestamp to control this visual object in a push data flow scenario. The following syntax of Table 2, would have to be added to StillTextureObject:

TABLE 2

|  | No. of bits | Mnemonic |
| --- | --- | --- |
| vbv_parameters | 1 | blsbf |
| if (vbv_parameters) { |  |  |
| bit_rate_msbs | 18 | uimsbf |
| marker_bit | 1 | blsbf |
| bit_rate_lsbs | 12 | uimsbf |
| vbv_size_msbs | 8 | uimsbf |
| marker_bit | 1 | blsfb |
| vbv_size_lsbs | 10 | uimsbf |
| vbv_occupancy_msbs | 11 | uimsbf |
| marker_bit | 1 | blsbf |
| vbv_occupancy_lsbs | 15 | uimsbf |
| time_stamp_fraction_bits | 5 | uimsbf |
| time_stamp_seconds | 17 | uimsbf |
| marker_bit | 1 | blsbf |
| time_stamp_fraction | 1–31 | uimsbf |
| } |  |  |

The number of bits of time_stamp_fraction is specified by time_stamp_fraction_bits which cannot be zero.

Mesh and Face Objects:

The mesh visual object access unit is the mesh object plane. The face visual object access unit is the face object plane. Since no reordering is required, $t_i = \tau_i$.

Both objects share a common specification of temporal information, the temporal_header ( ). When the mesh/face object is intra coded, the temporal_header ( ) can optionally specify a frame rate and a time stamp (an IEC 461 timecode specifying hours, minutes, seconds, and frames) specifying the composition time of the mesh/face object plane. The origin of the timecode (00:00:00:00) must agree with the temporal origin used in MPEG-4 System (ISO/IEC 14496-1) for DTS and CTS. The time between object planes is 1+Σnumber_of_frames_to_skip times the frame period. This allows an absolute CTS to be constructed from the CTS of a previous intra mesh/face object.

In order to apply the buffer model to the visual bitstream for mesh/face objects, the following VBV parameters controlled by vbv_parameters (except for low_delay and VOP_rate_code) need to be added to MeshObject and FaceObject, as shown in Table 3:

TABLE 3

|  | No. of bits | Mnemonic |
| --- | --- | --- |
| vbv_parameters | 1 | blsbf |
| if (vbv_parameters) { |  |  |
| bit_rate_msbs | 18 | uimsbf |
| marker_bit | 1 | blsbf |
| bit_rate_lsbs | 12 | uimsbf |
| vbv_size_msbs | 8 | uimsbf |
| marker_bit | 1 | blsfb |
| vbv_size_lsbs | 10 | uimsbf |
| vbv_occupancy_msbs | 11 | uimsbf |
| marker_bit | 1 | blsbf |
| vbv_occupancy_lsbs | 15 | uimsbf |
| } |  |  |

Rate-buffer Management:

Because it is the encoder's responsibility to prevent decoder VBV buffer overflow or underflow, the encoder must simulate the decoder VBV buffer. The simulated decoder VBV buffer can not be too full or too empty.

In order to prevent the decoder VBV underflow, all data of coded VOPs must be completely transmitted to the decoder buffer before their decoding time. Assume that encoding of the i-th VOP starts at time $t_i^e$ and its decoding time is $t_i$. After the i-th VOP being coded, the amount of transmitted data is given by encoder buffer fullness at $t_i^e$ (denoted by $eb_i^e$) plus the coded size of this VOP ($d_i$). This has to be less than or equal to the received data from channel $$eb_i^e + d_i \leq \int_{t_i^e}^{t_i^e + L} R_{vol,decoder}(t)\, dt,$$

where the decoding time $t_i = t_i^e + L$. For a constant delay channel, it has $R_{vol,decoder}(t) = R_{vol,encoder}(t-L)$ Thus, $$eb_i^e + d_i \leq \int_{t_i^e - L}^{t_i^e} R_{vol,encoder}(t)\, dt.$$

Therefore, encoder buffer fullness at $t_i^e$ is upper bounded by $$eb_i^e \leq \int_{t_i^e - L}^{t_i^e} R_{vol,encoder}(t)\, dt - d_i = T_2.$$

For the type of channels which have known minimum transmission rate $R_{vol,min}$, $T_2$ can be set to be a lower bound of $$\int_{t_i^e}^{t_i^e + L} R_{vol,decoder}(t)\, dt - d_i$$

as $T_2 = L \cdot R_{vol,min} - d_i$.

In order to prevent decoder buffer overflows, the decoder buffer fullness has to be less to the decoder buffer size B at time $t_i$ immediately before the removal of VOP i. This quantity can be expressed in terms of the decoder buffer fullness at $t_i^e$ ($b_i^e$), plus the number of bits entering the decoder VBV buffer between $t_i^e$ and $$t_i \left( \int_{t_i^e}^{t_i^e + L} R_{vol,decoder}(t) \, dt \right),$$

minus the number of bits removed form the decoder buffer between $t_i^e$ and $t_i$. The number of bits removed is the sum of encoder buffer occupancy at $t_i^e$ immediately before adding VOP i ($eb_i^e$) and decoder buffer occupancy at $t_i^e$ ($b_i^e$) because all bitstream data prior to VOP i must be consumed before VOP i can be decoded. The later two quantities represent bitstream data prior to VOP i since VOP i has not been added to the encoder buffer. Therefore, total bits in the decoder buffer are bounded by $$b_i^e + \int_{t_i^e}^{t_i^e + L} R_{vol,decoder}(t) \, dt - (eb_i^e + b_i^e) < B$$

Which yields $$\int_{t_i^e}^{t_i^e + L} R_{vol,decoder}(t) \, dt - eb_i^e + b_i^e < B.$$

Therefore, encoder_buffer_fullness at $t_i^e$ is lower bounded by $$eb_i^e > \int_{t_i^e}^{t_i^e + L} R_{vol,decoder}(t) \, dt - B = T_1.$$

The same arguments given above about the constant delay channel can be applied here. Also, for the type of channels which have known maximum transmission rate $R_{vol,max}$, $T_1$ can be set to be a upper bound of $$\int_{t_i^e}^{t_i^e + L} R_{vol,decoder}(t) \, dt - B \text{ as } T_1 = L \cdot R_{vol,max} - B.$$

The bounds $T_1$ and $T_2$ are checked in the rate-control algorithm and the corrective action are to perform bit-allocation of the VOPs and adjust quantization levels of the coding units (e.g. VOP, macroblocks).

The encoder must take the following corrective action if the simulated decoder VBV buffer gets too full or too empty:

1. If the simulated decoder VBV buffer becomes too full (i.e. the encoder VBV buffer is too empty), the encoder can correct the problem by:
   (a) reducing the quantization level to generate large VOPs, or
   (b) outputting stuffing bits at the end of the VOP. Note that generating larger VOPs reduces the decoder VBV occupancy.
2. If the simulated decoder VBV becomes too empty (i.e. the encoder VBV buffer is too full), the encoder can correct the problem by:
   (a) increasing quantization levels to generate fewer bits, or
   (b) delaying the generation of the next VOP (often called skipping VOP), or
   (c) zeroing the high frequency coefficients to reduce the number of bits/VOP generated.

It should now be appreciated that the present invention provides a video rate buffer model for bounding the memory requirements of a video decoder in a push dataflow scenario. The rate buffer model of the present invention constrains the video encoder to producing bitstreams that are decodable with a predetermined buffer memory size. Thus, push dataflow applications are efficiently accommodated.

What is claimed is:

1. An encoder apparatus for enabling a push dataflow bitstream without causing a modeled data buffer of predetermined memory size for the pushed data at a decoder to overflow or underflow, comprising:

a processor adapted to encode data to provide the bitstream for communication to a decoder; wherein:
   the encoded data comprises at least one video or visual object (VO) with at least one video or visual object layer (VOL), including an associated header, followed by at least one video or visual object plane (VOP);
   a field in the VOL header designates an occupancy of the buffer just before removal of the first VOP following the VOL header from the buffer; and
   said processor uses a simulation to simulate the decoder buffer and controls the bitstream in response to the simulation to preclude overflow or underflow of the decoder buffer.

2. The apparatus of claim 1, wherein:
when the buffer is initially empty, the occupancy field is examined to determine an initial occupancy of the buffer before decoding the initial VOP.

3. The apparatus of claim 1, wherein:
the processor provides a flag to control the inclusion of at least one field in the VOL header when equivalent information is not present in an encapsulating system multiplex.

4. The apparatus of claim 3, wherein:
the flag allows a visual elementary stream of the bitstream as a standalone entity to specify a buffer model.

5. The apparatus of claim 3, wherein:
the at least one field whose inclusion in the VOL header is controlled by the flag designates a VOP rate of the bitstream.

6. The apparatus of claim 3, wherein:
the at least one field whose inclusion in the VOL header is controlled by the flag designates a peak bit rate of the bitstream.

7. The apparatus of claim 3, wherein:
the at least one field whose inclusion in the VOL header is controlled by the flag designates whether the VOL contains at least one B-VOP.

8. The apparatus of claim 3, wherein:
the at least one field whose inclusion in the VOL header is controlled by the flag designates the size of the modeled buffer.

9. The apparatus of claim 3, wherein:
the at least one field whose inclusion in the VOL header is controlled by the flag designates said field that designates the occupancy of the buffer.

10. The apparatus of claim 1, wherein:
the video or visual object comprises a video object.

11. The apparatus of claim 1, wherein:
the video or visual object comprises a still texture object.

12. The apparatus of claim 1, wherein:
the video or visual object comprises a mesh object.

13. The apparatus of claim 1, wherein:
the video or visual object comprises a face object.

14. The apparatus of claim 1, wherein:
the encoded data comprises a plurality of VOLs, and a decoder buffer model is applied independently to each VOL using buffer size and rate functions particular to each VOL.

15. The apparatus of claim 1, wherein:
the bitstream is compatible with an MPEG-4 video coding standard.

16. The apparatus of claim 1, wherein:
additional fields are provided in respective subsequent VOL headers to designate respective subsequent buffer occupancy levels.

17. The apparatus of claim 16, wherein:
the processor maintains a difference between the additional fields in the subsequent VOL headers and a running cumulative buffer occupancy just before removal of a VOP from the buffer within a tolerance.

18. The apparatus of claim 1, wherein:
the processor determines a size ($d_i$) of a current VOP as a number of bits extending to the last bit of the current VOP and starting from either the last bit of the previous VO or the first bit of a start code for the first VOP of the encoded data.

19. The apparatus of claim 1, wherein:
the processor determines a decoding time $t_i$ of an ith VOP, wherein:
(a) $t_i = \tau_i$ if the VOL contains no B-VOPs, where $\tau_i$ is a composition time of the ith VOP, and
(b) $t_i = \tau_i - m_i$, when the ith VOP is an anchor VOP, and $m_i$ accounts for a delay of at least one immediately subsequent B-VOP to be composited or presented.

20. The apparatus of claim 1, wherein:
the processor determines a decoding time $t_i$ of an ith VOP, wherein:
(a) $t_i = \tau_i$ if the VOL contains no B-VOPs, where $\tau_i$ is a presentation time of the ith VOP when the decoder is a no-compositor decoder, and
(b) $t_i = \tau_i - m_i$, when the ith VOP is an anchor VOP, and $m_i$ accounts for a delay of at least one immediately subsequent B-VOP to be composited or presented.

21. The apparatus of claim 1, wherein:
said pushed data flow comprises video data that includes intraframe (I), prediction (P) and bi-directional (B) video object planes (VOPs).

22. The apparatus of claim 21, wherein said processor controls said bitstream by at least one of:
allocating bits between different VOPs, and
adjusting quantization levels of coding units forming said VOPs.

23. The apparatus of claim 22, wherein:
the modeled data buffer comprises a visual or video buffering verifier (VBV) buffer.

24. The apparatus of claim 23, wherein:
said processor monitors the VBV buffer and, when the simulation indicates that the VBV buffer has or will become too full, a quantization level for said coding units is reduced.

25. The apparatus of claim 23, wherein:
said processor monitors the VBV buffer and, when the simulation indicates that the VBV buffer has or will become too empty, said quantization level for said coding units is increased.

26. The apparatus of claim 23, wherein:
said processor monitors the VBV buffer and, when the simulation indicates that the VBV buffer has or will become too empty, the generation of the next VOP is delayed.

27. The apparatus of claim 23, wherein:
said processor monitors the VBV buffer and, when the simulation indicates that the VBV buffer has or will become too empty, high frequency coefficients of said coding units are zeroed to reduce the number of bits generated per VOP.

28. The apparatus of claim 23, wherein:
said processor monitors the VBV buffer and, when it is determined that the VBV buffer has or will become too full, stuffing bits are added to the end of at least one VOP.

29. The apparatus of claim 1, wherein:
the processor includes an encoder buffer for receiving the encoded data prior to providing the bitstream therefrom; and
the processor controls the rate of the bitstream such that the fullness of the encoder buffer $eb_i^e$ after encoding an ith VOP is upper bounded by $$\int_{t_i^e}^{t_i^e+L} R_{vol,decoder}(t)\,dt - d_i,$$

where $t_i^e$ is the time of starting to encode the ith VOP, L is the time difference between the encoding time $t_i^e$ and the decoding time of the ith VOP, $d_i$ is the amount of coded data for the ith VOP, and $R_{vol,decoder}(t)$ is the instantaneous channel bit rate seen by the decoder.

30. The apparatus of claim 1, wherein:
the processor includes an encoder buffer for receiving the encoded data prior to providing the bitstream therefrom; and
the processor controls the rate of the bitstream such that the fullness of the encoder buffer $eb_i^e$ after encoding an ith VOP is upper bounded by $$\int_{t_i^e-L}^{t_i^e} R_{vol,encoder}(t)\,dt - d_i,$$

where $t_i^e$ is the time of starting to encode the ith VOP, L is the time difference between the encoding time $t_i^e$ and the decoding time of the ith VOP, $d_i$ is the amount of coded data for the ith VOP, and $R_{vol,encoder}(t)$ is the instantaneous channel bit rate seen by the encoder.

31. The apparatus of claim 1, wherein:
the processor includes an encoder buffer for receiving the encoded data prior to providing the bitstream therefrom; and
the processor controls the rate of the bitstream such that the fullness of the encoder buffer $eb_i^e$ after encoding an ith VOP is lower bounded by $$\int_{t_i^e}^{t_i^e+L} R_{vol,decoder}(t)\,dt - B,$$

where $t_i^e$ is the time of starting to encode the ith VOP, L is the time difference between the encoding time $t_i^e$ and the decoding time of the ith VOP, B is the size of the decoder buffer, and $R_{vol,decoder}(t)$ is the instantaneous channel bit rate seen by the decoder.

32. The apparatus of claim 1, wherein:
the processor includes an encoder buffer for receiving the encoded data prior to providing the bitstream therefrom; and the processor controls the rate of the bitstream such that the fullness of the encoder buffer $eb_i^e$ after encoding an ith VOP is lower bounded by $$\int_{t_i^e-L}^{t_i^e} R_{vol,encoder}(t)\,dt - B,$$

where $t_i^e$ is the time of starting to encode the ith VOP, L is the time difference between the encoding time $t_i^e$ and the decoding time of the ith VOP, B is the size of the decoder buffer, and $R_{vol,encoder}(t)$ is the instantaneous channel bit rate seen by the encoder.

33. An encoding method for enabling a push dataflow bitstream without causing a modeled data buffer of predetermined memory size for the pushed data at a decoder to overflow or underflow, comprising the steps of:

encoding data to provide the bitstream for communication to a decoder; wherein:
the encoded data comprises at least one video or visual object (VO) with at least one video or visual object layer (VOL), including an associated header, followed by at least one video or visual object plane (VOP); and
a field in the VOL header designates an occupancy of the buffer just before removal of the first VOP following the VOL header from the buffer; and
using a simulation to simulate the decoder buffer and control the bitstream in response to the simulation to preclude overflow or underflow of the decoder buffer.

34. The method of claim 33, wherein:
when the buffer is initially empty, the occupancy field is examined to determine an initial occupancy of the buffer before decoding the initial VOP.

35. The method of claim 33, comprising the further step of:
providing a flag to control the inclusion of at least one field in the VOL header when equivalent information is not present in an encapsulating system multiplex.

36. The method of claim 35, wherein:
the flag allows a visual elementary stream of the bitstream as a standalone entity to specify a buffer model.

37. The method of claim 35, wherein:
the at least one field whose inclusion in the VOL header is controlled by the flag designates a VOP rate of the bitstream.

38. The method of claim 35, wherein:
the at least one field whose inclusion in the VOL header is controlled by the flag designates a peak bit rate of the bitstream.

39. The method of claim 35, wherein:
the at least one field whose inclusion in the VOL header is controlled by the flag designates whether the VOL contains at least one B-VOP.

40. The method of claim 35, wherein:
the at least one field whose inclusion in the VOL header is controlled by the flag designates the size of the modeled buffer.

41. The method of claim 35, wherein:
the at least one field whose inclusion in the VOL header is controlled by the flag designates said field that designates the occupancy of the buffer.

42. The method of claim 33, wherein:
the video or visual object comprises a video object.

43. The method of claim 33, wherein:
the video or visual object comprises a still texture object.

44. The method of claim 33, wherein:
the video or visual object comprises a mesh object.

45. The method of claim 33, wherein:
the video or visual object comprises a face object.

46. The method of claim 33, wherein:
the encoded data comprises a plurality of VOLs, and a decoder buffer model is applied independently to each VOL using buffer size and rate functions particular to each VOL.

47. The method of claim 33, wherein:
the bitstream is compatible with an MPEG-4 video coding standard.

48. The method of claim 33, wherein:
additional fields are provided in respective subsequent VOL headers to designate respective subsequent buffer occupancy levels.

49. The method of claim 48, comprising the further step of:
maintaining a difference between the additional fields in the subsequent VOL headers and a running cumulative buffer occupancy just before removal of a VOP from the buffer within a tolerance.

50. The method of claim 33, comprising the further step of:
determining a size ($d_i$) of a current VOP as a number of bits extending to the last bit of the current VOP and starting from either the last bit of the previous VO or the first bit of a start code for the first VOP of the encoded data.

51. The method of claim 33, comprising the further step of:
determining a decoding time $t_i$ of an ith VOP, wherein:
(a) $t_i=\tau_i$ if the VOL contains no B-VOPs, where $\tau_i$ is a composition time of the ith VOP, and
(b) $t_i=\tau_i-m_i$, when the ith VOP is an anchor VOP, and $m_i$ accounts for a delay of at least one immediately subsequent B-VOP to be composited or presented.

52. The method of claim 33, comprising the further step of:
determining a decoding time $t_i$ of an ith VOP, wherein:
(a) $t_i=\tau_i$ if the VOL contains no B-VOPs, where $\tau_i$ is a presentation time of the ith VOP when the decoder is a no-compositor decoder, and
(b) $t_i=\tau_i-m_i$, when the ith VOP is an anchor VOP, and $m_i$ accounts for a delay of at least one immediately subsequent B-VOP to be composited or presented.

53. The method of claim 33, wherein:
said pushed data flow comprises video data that includes intraframe (I), prediction (P) and bi-directional (B) video object planes (VOPs).

54. The method of claim 53, comprising the further step of controlling said bitstream by at least one of:
allocating bits between different VOPs, and
adjusting quantization levels of coding units forming said VOPs.

55. The method of claim 54, wherein:
the modeled data buffer comprises a visual or video buffering verifier (VBV) buffer.

56. The method of claim 55, comprising the further step of:
monitoring the VBV buffer and, when the simulation indicates that the VBV buffer has or will become too full, reducing a quantization level for said coding units.

57. The method of claim 55, comprising the further step of:
monitoring the VBV buffer and, when the simulation indicates that the VBV buffer has or will become too empty, increasing a quantization level for said coding units.

58. The method of claim 55, comprising the further step of:
monitoring the VBV buffer and, when the simulation indicates that the VBV buffer has or will become too empty, delaying the generation of the next VOP.

59. The method of claim 55, comprising the further step of:
monitoring the VBV buffer and, when the simulation indicates that the VBV buffer has or will become too empty, zeroing high frequency coefficients of said coding units to reduce the number of bits generated per VOP.

60. The method of claim 55, comprising the further step of:
monitoring the VBV buffer and, when it is determined that the VBV buffer has or will become too full, adding stuffing bits to the end of at least one VOP.

61. The method of claim 33, wherein an encoder buffer receives the encoded data prior to providing the bitstream therefrom, comprising the further step of:
controlling the rate of the bitstream such that the fullness of the encoder buffer $eb_i^e$ after encoding an ith VOP is upper bounded by $$\int_{t_i^e}^{t_i^e+L} R_{vol,decoder}(t)\,dt - d_i,$$

where $t_i^e$ is the time of starting to encode the ith VOP, L is the time difference between the encoding time $t_i^e$ and the decoding time of the ith VOP, $d_i$ is the amount of coded data for the ith VOP, and $R_{vol,decoder}(t)$ is the instantaneous channel bit rate seen by the decoder.

62. The method of claim 33, wherein an encoder buffer receives the encoded data prior to providing the bitstream therefrom, comprising the further step of:
controlling the rate of the bitstream such that the fullness of the encoder buffer $eb_i^e$ after encoding an ith VOP is upper bounded by $$\int_{t_i^e-L}^{t_i^e} R_{vol,encoder}(t)\,dt - d_i,$$

where $t_i^e$ is the time of starting to encode the ith VOP, L is the time difference between the encoding time $t_i^e$ and the decoding time of the ith VOP, $d_i$ is the amount of coded data for the ith VOP, and $R_{vol,encoder}(t)$ is the instantaneous channel bit rate seen by the encoder.

63. The method of claim 33, wherein an encoder buffer receives the encoded data prior to providing the bitstream therefrom, comprising the further step of:
controlling the rate of the bitstream such that the fullness of the encoder buffer $eb_i^e$ after encoding an ith VOP is lower bounded by $$\int_{t_i^e}^{t_i^e+L} R_{vol,decoder}(t)\,dt - B,$$

where $t_i^e$ is the time of starting to encode the ith VOP, L is the time difference between the encoding time $t_i^e$ and the decoding time of the ith VOP, B is the size of the decoder buffer, and $R_{vol,decoder}(t)$ is the instantaneous channel bit rate seen by the decoder.

64. The method of claim 33, wherein an encoder buffer receives the encoded data prior to providing the bitstream therefrom, comprising the further step of:
controlling the rate of the bitstream such that the fullness of the encoder buffer $eb_i^e$ after encoding an ith VOP is lower bounded by $$\int_{t_i^e-L}^{t_i^e} R_{vol,encoder}(t)\,dt - B,$$

where $t_i^e$ is the time of starting to encode the ith VOP, L is the time difference between the encoding time $t_i^e$ and the decoding time of the ith VOP, B is the size of the decoder buffer, and $R_{vol/encoder}(t)$ is the instantaneous channel bit rate seen by the encoder.

65. A decoder apparatus, comprising:
a data buffer of predetermined memory size; and
means for receiving a push dataflow bitstream that is obtained by encoding data in accordance with a model of the buffer so that the modeled buffer does not overflow or underflow; wherein:
the encoded data comprises at least one video or visual object (VO) with at least one video or visual object layer (VOL), including an associated header, followed by at least one video or visual object plane (VOP); and
a field in the VOL header designates an occupancy of the modeled buffer just before removal of the first VOP following the VOL header from the modeled buffer.

66. The apparatus of claim 65, wherein:
the encoded data comprises a flag that controls the inclusion of at least one field in the VOL header when equivalent information is not present in an encapsulating system multiplex.

67. The apparatus of claim 66, wherein:
the flag allows a visual elementary stream of the bitstream as a standalone entity to specify a buffer model.

68. The apparatus of claim 66, wherein:
the at least one field whose inclusion in the VOL header is controlled by the flag designates a VOP rate of the bitstream.

69. The apparatus of claim 66, wherein:
the at least one field whose inclusion in the VOL header is controlled by the flag designates a peak bit rate of the bitstream.

70. The apparatus of claim 66, wherein:
the at least one field whose inclusion in the VOL header is controlled by the flag designates whether the VOL contains at least one B-VOP.

71. The apparatus of claim 66, wherein:

the at least one field whose inclusion in the VOL header is controlled by the flag designates the size of the modeled buffer.

72. The apparatus of claim 66, wherein:

the at least one field whose inclusion in the VOL header is controlled by the flag designates said field that designates the occupancy of the buffer.

73. The apparatus of claim 65, wherein:

the video or visual object comprises a video object.

74. The apparatus of claim 65, wherein:

the video or visual object comprises a still texture object.

75. The apparatus of claim 65, wherein:

the video or visual object comprises a mesh object.

76. The apparatus of claim 65, wherein:

the video or visual object comprises a face object.

77. The apparatus of claim 65, wherein:

the encoded data comprises a plurality of VOLs, and a decoder buffer model is applied independently to each VOL using buffer size and rate functions particular to each VOL.

78. The apparatus of claim 65, wherein:

the bitstream is compatible with an MPEG-4 video coding standard.

79. The apparatus of claim 65, wherein:

additional fields are provided in respective subsequent VOL headers to designate respective subsequent buffer occupancy levels.

80. The apparatus of claim 65, wherein:

said pushed data flow comprises video data that includes intraframe (I), prediction (P) and bi-directional (B) video object planes (VOPs).

81. A method for providing a push dataflow bitstream at a decoder, comprising the steps of:

providing a data buffer of predetermined memory size at the decoder; and receiving the push dataflow bitstream at the decoder, wherein said bitstream is obtained by encoding data in accordance with a model of the buffer so that the modeled buffer does not overflow or underflow; wherein:

the encoded data comprises at least one video or visual object (VO) with at least one video or visual object layer (VOL), including an associated header, followed by at least one video or visual object plane (VOP); and a field in the VOL header designates an occupancy of the modeled buffer just before removal of the first VOP following the VOL header from the modeled buffer.

* * * * *